United States Patent
Lee et al.

(10) Patent No.: US 11,489,409 B2
(45) Date of Patent: Nov. 1, 2022

(54) MOTOR HOUSING ASSEMBLY

(71) Applicant: LG Magna e-Powertrain Co., Ltd., Incheon (KR)

(72) Inventors: Deokkyu Lee, Seoul (KR); Jinho Yoon, Seoul (KR); Junggu Lee, Seoul (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 204 days.

(21) Appl. No.: 16/901,082

(22) Filed: Jun. 15, 2020

(65) Prior Publication Data
US 2021/0234434 A1 Jul. 29, 2021

(30) Foreign Application Priority Data
Jan. 29, 2020 (KR) .................. 10-2020-0010427

(51) Int. Cl.
*H02K 9/19* (2006.01)
*H02K 5/02* (2006.01)
*H02K 5/06* (2006.01)
*H02K 5/18* (2006.01)
*H02K 5/20* (2006.01)

(52) U.S. Cl.
CPC .............. *H02K 9/19* (2013.01); *H02K 5/02* (2013.01); *H02K 5/06* (2013.01); *H02K 5/18* (2013.01); *H02K 5/20* (2013.01)

(58) Field of Classification Search
CPC .......... H02K 9/19; H02K 9/193; H02K 9/197; H02K 5/203; H02K 5/20; H02K 5/02; H02K 5/06; H02K 5/18

USPC ................................. 310/54, 58, 59
See application file for complete search history.

(56) References Cited

U.S. PATENT DOCUMENTS

| | | | |
|---|---|---|---|
| 4,682,065 | A | 7/1987 | English et al. |
| 8,161,643 | B2 | 4/2012 | Smith et al. |
| 9,000,631 | B2 | 4/2015 | Prix |
| 9,768,658 | B2 | 9/2017 | Bulatow |

(Continued)

FOREIGN PATENT DOCUMENTS

| | | | | |
|---|---|---|---|---|
| DE | 102010008584 A1 * | 8/2011 | ............ | H02K 11/33 |
| DE | 102010008584 A1 | 8/2011 | | |

(Continued)

OTHER PUBLICATIONS

Machine translation of DE-102010008584-A1. (Year: 2011).*
European Search Report, dated Mar. 9, 2021, issued in European Application No. 20195468.2 (10 pages).

*Primary Examiner* — Michael Andrews
(74) *Attorney, Agent, or Firm* — Birch, Stewart, Kolasch & Birch, LLP (57) ABSTRACT

A motor housing assembly for cooling a motor assembly is disclosed. The motor housing assembly includes a stator and a rotor. To reduce a weight and a manufacturing cost, the motor housing assembly includes an aluminum housing coupled to an outer circumferential surface of a motor assembly and configured to form a first space between the aluminum housing and the motor assembly, the first space including an oil flow channel and a plastic housing coupled to an outer circumferential surface of the aluminum housing and configured to form a second space between the plastic housing and the aluminum housing, the second space including a water flow channel.

17 Claims, 9 Drawing Sheets

(56) References Cited

U.S. PATENT DOCUMENTS

| | | | | |
|---|---|---|---|---|
| 2010/0007227 A1* | 1/2010 | Smith | ............... | H02K 5/20 |
| | | | | 310/64 |
| 2012/0313465 A1* | 12/2012 | Prix | ............... | H02K 11/33 |
| | | | | 310/59 |
| 2015/0069862 A1* | 3/2015 | Bulatow | ............ | H02K 5/15 |
| | | | | 310/43 |
| 2017/0244305 A1* | 8/2017 | Ploeger | ............ | H02K 5/20 |

FOREIGN PATENT DOCUMENTS

| | | |
|---|---|---|
| DE | 102012205754 A1 | 10/2013 |
| DE | 102012022453 A1 | 5/2014 |
| WO | WO 2017/018578 A1 | 2/2017 |

\* cited by examiner

Radial direction

One side in axial direction ←→ The other side in axial direction

MOTOR HOUSING ASSEMBLY

CROSS-REFERENCE TO RELATED APPLICATION

This application claims the benefit of Korean Patent Application No. 10-2020-0010427, filed on Jan. 29, 2020, in the Korean Intellectual Property Office, the disclosure of which is incorporated herein in its entirety by reference.

BACKGROUND

1. Field

This disclosure relates to a motor housing assembly for cooling a motor assembly.

2. Background

A motor is a power device that applies a current to rotate a rotor. The rotor rotates through electromagnetic interaction with a stator. For this, a coil is wound on the stator and the rotor includes a permanent magnet (or vice versa). In response to the current being applied, a magnetic field may be formed around the coil. The magnetic field may lead to electromagnetic interaction between the coil and the permanent magnet so that a rotational force for driving mechanical load is assigned to the rotor.

The motor is used in various fields. Recently, with increasing necessity and demand for hybrid vehicles and electric vehicles, interests in motors required for the vehicles are also increasing.

A vehicle motor may be required to rotate at high speed and often exposed to a situation in which it is driven for a long time, so a technology for effectively discharging heat generated from the motor is required.

Also, it is also required to reduce weights of the motor and components of the motor to increase the energy efficiency of the vehicle.

Typically, a cooling structure for heat dissipation of the motor may be implemented through an oil flow channel and a water flow channel. Since the two cooling materials have different properties, the two channels may be provided independently of each other. Also, a motor housing structure forming each of the channels may be required.

A motor housing implementing such cooling channel may be implemented with metal, in particular, aluminum material to satisfy requirements of heat resistance, shock resistance, wear resistance, and the like in general.

However, such metal housing may hinder the weight reduction of the motor structure and may increase a manufacturing cost.

SUMMARY

An aspect is to solve the issues of an increase in total weight, an increase in manufacturing cost, and the like due to a cooling structure in a motor structure.

According to an aspect, there is provided a motor housing assembly including an aluminum housing coupled to an outer circumferential surface of a motor assembly and configured to form a first space between the aluminum housing and the motor assembly, the first space including an oil flow channel and a plastic housing coupled to an outer circumferential surface of the aluminum housing and configured to form a second space between the plastic housing and the aluminum housing, the second space including a water flow channel.

The plastic housing may be coupled to the aluminum housing through press-fitting.

The motor housing assembly may further include an insertion chamfer at one axial end of the aluminum housing, the insertion chamfer including a surface inclined in a radially inward direction.

A first joining surface may be provided to be in contact with an inner circumferential surface of the plastic housing at one axial end of the outer circumferential surface of the aluminum housing.

The aluminum housing may further include a partition that protrudes from the outer circumferential surface in a radially outward direction, the partition being configured to form the water flow channel. The partition may include a second joining surface to be in contact with an inner circumferential surface of the plastic housing.

The partition may include a plurality of partitions, each of the partition being configured to extend to a predetermined length in an axial direction of the motor assembly. a first partition of a pair of adjacent partitions selected from the plurality of partitions extends axially from one axial end of the aluminum housing, and a second partition of the pair of adjacent partitions extends axially from an opposite axial end of the aluminum housing.

The plurality of partitions may include a shield wall that extends from the one end to the opposite end in the axial direction to block a flow of a cooling fluid. One of two channels adjacent to both sides of the shield wall may form an inlet channel and the other of the two channels may form an outlet channel.

An inner circumferential surface of the plastic housing may have a generally uniform diameter.

The motor housing assembly may further include a rear bracket coupled to the aluminum housing at one axial end of the aluminum housing and a rib configured to radially extend from an opposite axial end of the aluminum housing. One axial end of the plastic housing is in contact with the rear bracket and an opposite axial end of the plastic housing is in contact with the rib.

The rear bracket, the plastic housing, and the rib may be in contact with one another in an axial direction.

The motor housing assembly may further include a first O-ring provided between the plastic housing and the rear bracket, a second O-ring provided between the rear bracket and the aluminum housing, and a third O-ring provided between the aluminum housing and the plastic housing.

The motor housing assembly may further include a first recessed groove extending in an axial direction from a first surface of the rear bracket where the plastic housing and the rear bracket contact each other, the first recessed groove being configured to receive the first O-ring, a second recessed groove extending in a radial direction from a second surface of the rear bracket where the rear bracket and the aluminum housing contact each other, the second raises groove being configured to receive the second O-ring and a third recessed groove extending in the radial direction from a surface of the aluminum housing where the aluminum housing and the plastic housing contact each other, the third recessed groove being configured to receive the third O-ring.

The motor housing assembly may further include a water-cooling gate in the rear bracket, the water-cooling gate including a through-hole extending toward the second space.

The rear bracket may further include an insertion groove into which the aluminum housing is inserted.

The aluminum housing may be die-cast and the plastic housing may be injection-molded.

The aluminum housing may further include an oil-cooling gate formed in one side surface and connecting the first space with an external area to receive or discharge a cooling fluid.

The oil-cooling gate may include an oil-cooling inlet and an oil-cooling outlet. The oil-cooling inlet may be formed in an upper portion of one side surface of the aluminum housing. The oil-cooling outlet may be formed in a lower portion of the one side surface of the aluminum housing.

The aluminum housing may further include an extended channel configured to move the cooling fluid introduced through the oil-cooling inlet, toward one axial end of the motor assembly by a predetermined distance from an opposite axial end of the motor assembly.

The extended channel may include a drop hole through which a portion of the cooling fluid is configured to enter the first space after traveling by the predetermined distance toward the one axial end and a guide plate configured to direct a remaining portion of the cooling to enter the first space after traveling farther than the predetermined distance toward the one axial end.

The plastic housing may be cut by a first distance at the other end and the aluminum housing may be cut by the first distance at one end, so that the plastic housing and the aluminum housing are coupled.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
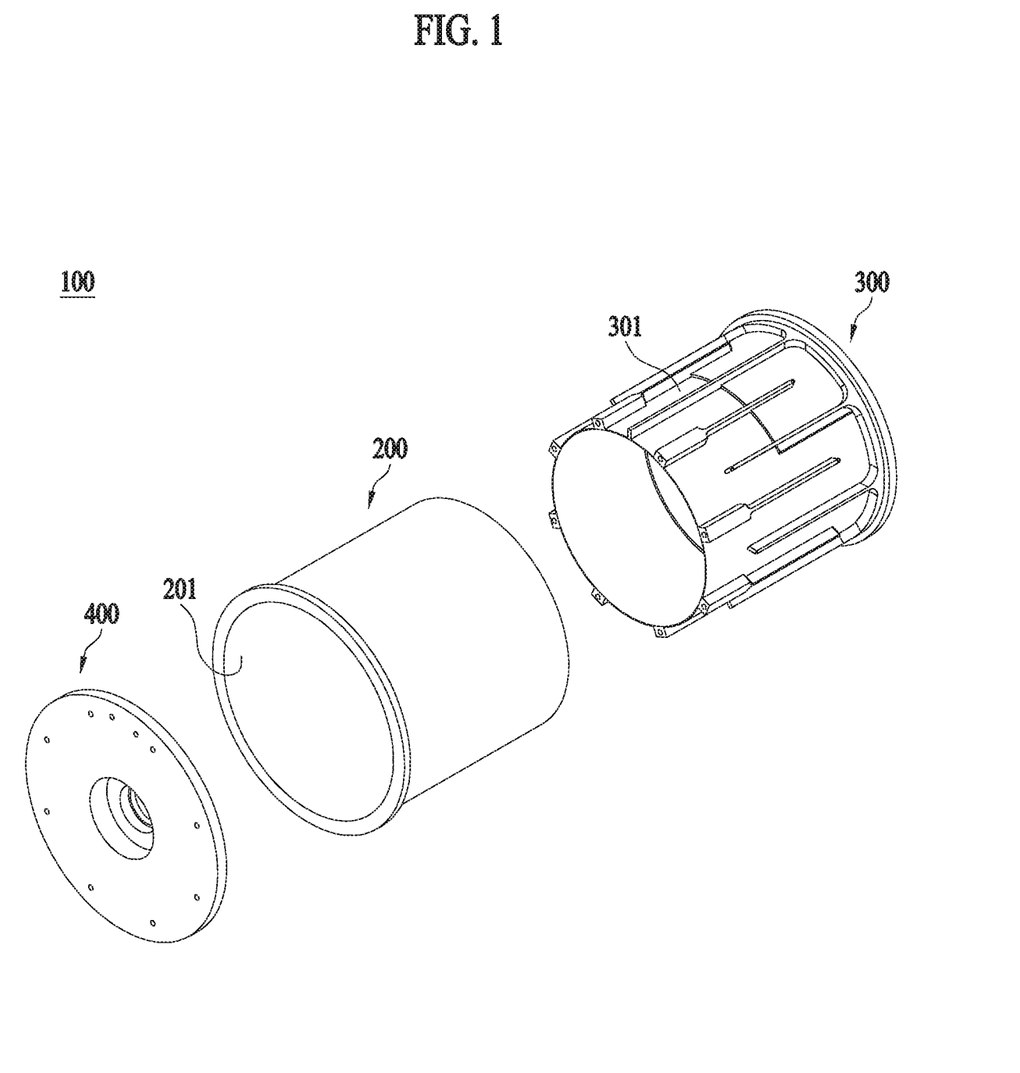
FIG. 1 is an exploded perspective view illustrating a motor housing assembly according to the present disclosure.
Figure 2:
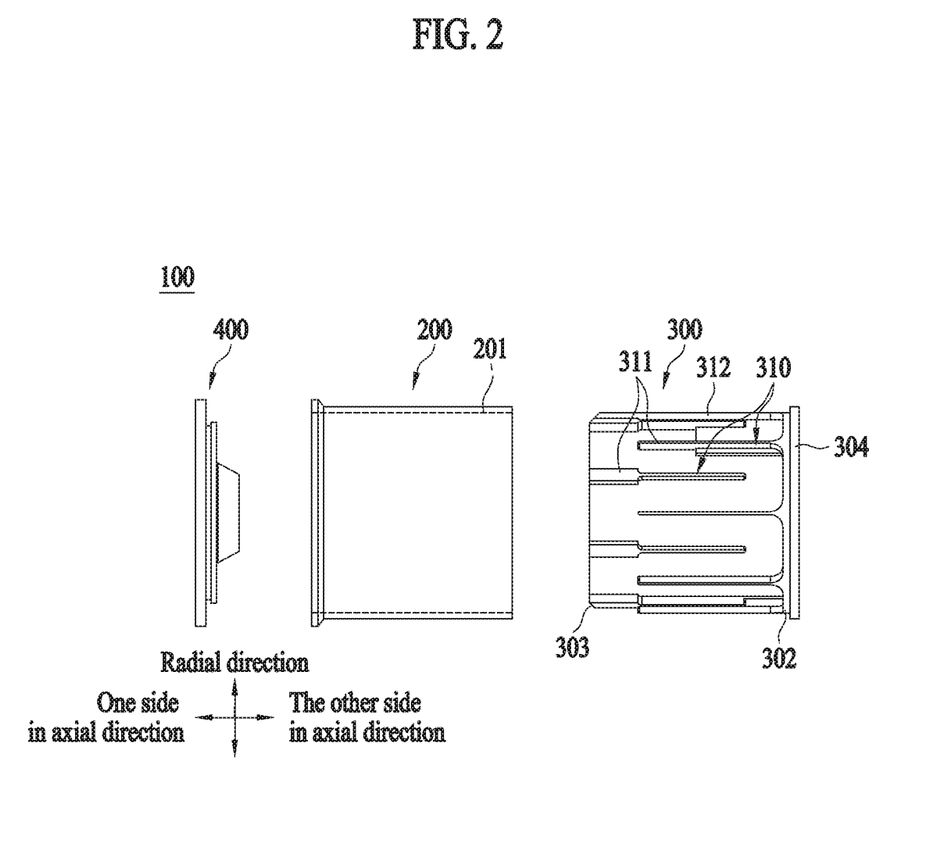
FIG. 2 is an exploded front view illustrating a motor housing assembly according to the present disclosure.
Figure 3:
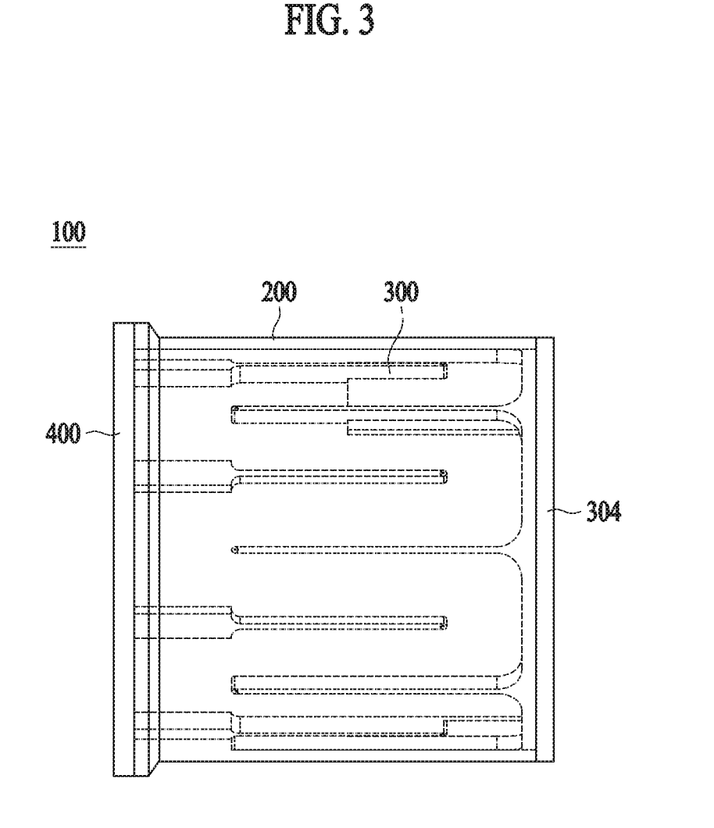
FIG. 3 is an assembled front view illustrating a motor housing assembly according to the present disclosure.

FIG. 1 is an exploded perspective view illustrating a motor housing assembly 100 according to the present disclosure, FIG. 2 is an exploded front view of the motor housing assembly 100, and FIG. 3 is an assembled front view of the motor housing assembly 100.

To solve the aforementioned issues, a portion of the motor housing assembly 100 may be replaced with a plastic material. In a related art, both an inner housing for forming an oil flow channel and an outer housing for forming a water flow channel are made of a metal material. In the present disclosure, the motor housing assembly 100 may have an inner housing formed of a metal material and an outer housing formed of a plastic material.

Specifically, the motor housing assembly 100 may include an aluminum housing 300 as the inner housing and include a plastic housing 200 as the outer housing. The plastic housing 200 and the aluminum housing 300 may be coupled through press-fitting. A motor assembly 10 may be mounted in the motor housing assembly 100 in which the plastic housing 200 and the aluminum housing 300 are coupled. The motor assembly 10 may include a rotor and a stator. In the present embodiment, the metal material may be, for example, an aluminum material, but this is because material properties such as manufacturing cost, density, and stiffness currently meet conditions required for a motor housing. Therefore, as would be apparent to those skilled in the art, the aluminum material may be replaced with other various metal materials having similar specifications as necessary.

Based on a radial direction, the aluminum housing 300 may be disposed outward of the motor assembly 10, and the plastic housing 200 may be disposed outward of the aluminum housing 300. In this case, spaces may be formed between the components so that a cooling fluid flows in or comes out.

Specifically, the aluminum housing 300 may be coupled to an outer circumferential surface of the motor assembly 10 to form a first space 510 including oil flow channel. The plastic housing 200 may be coupled to an outer circumferential surface 301 of the aluminum housing 300 to form a second space 520 including a water flow channel. The cooling fluid used in the water flow channel may be cooling water. The cooling fluid used in the oil flow channel may be oil.

As such, a portion of the metal housing may be replaced with the plastic material, thereby achieving a lightness of the motor housing assembly 100.

Also, since the plastic housing 200 and the aluminum housing 300 are coupled through the press-fitting, separate bolt-coupling may be omitted, which may lead to simplification of structure, reduction in working time, increase of durability, and the like.

For the press-fitting of the aluminum housing 300 and the plastic housing 200, the outer circumferential surface 301 of the aluminum housing 300 and an inner circumferential surface 201 of the plastic housing 200 may be provided in sizes sufficient to contact each other in at least one area.

Specifically, the plastic housing 200 may be manufactured to have an inner diameter less than an outer diameter of the aluminum housing 300 for the press-fitting, so that both components are coupled as the inner diameter of the plastic housing 200 increases.

In the example embodiment, the aluminum housing 300 may have a first joining surface 302 to be in contact with the inner circumferential surface 201 of the plastic housing 200 in one area of the other end of the outer circumferential surface 301. In this case, an outer diameter of the first joining surface 302 may be equal to the inner diameter of the plastic housing 200 corresponding to the corresponding area.

In addition, an insertion chamfer 303 that includes a surface inclined in a radially inward direction may be provided at one axial end of the aluminum housing 300. Due to the insertion chamfer 303, an outer diameter of one end area of the aluminum housing 300 may be formed to be sufficiently smaller than an inner diameter of the other end of the plastic housing 200, so that an initial insertion of both components is easily performed.

Figure 4:
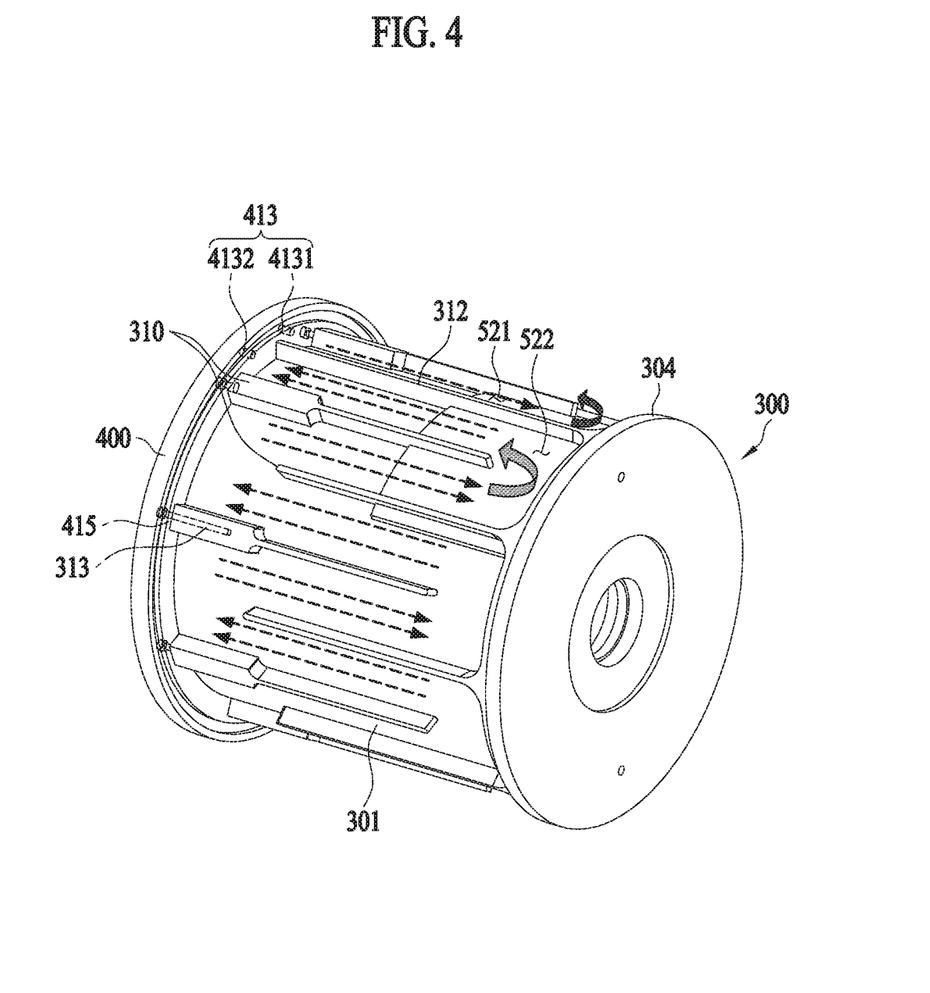
FIG. 4 is a perspective view illustrating a motor housing assembly from which a plastic housing is removed according to the present disclosure.
Figure 5:
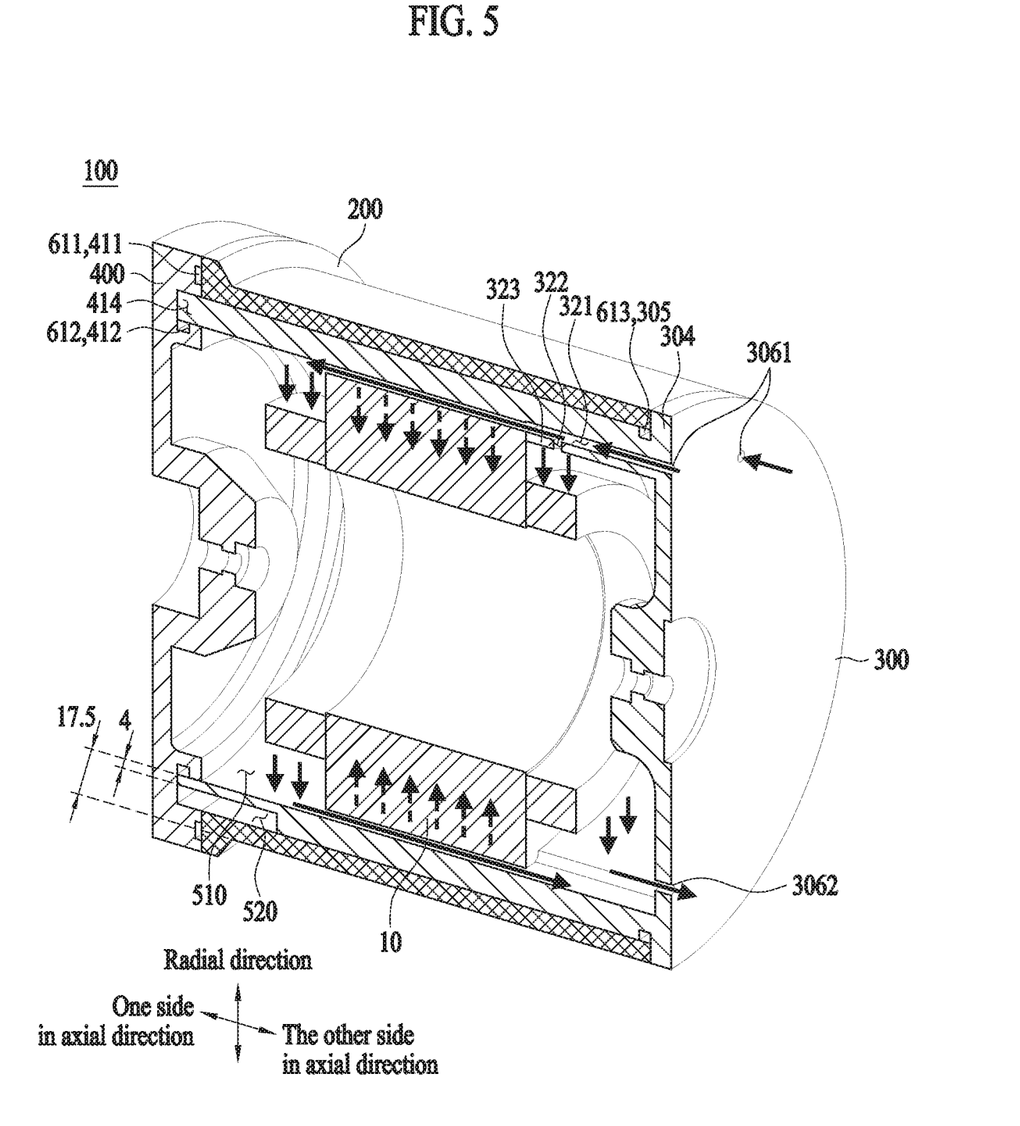
FIG. 5 is a longitudinal sectional view illustrating a motor housing assembly according to the present disclosure.

FIG. 4 is a perspective view illustrating the motor housing assembly 100 from which the plastic housing 200 is removed and FIG. 5 is a longitudinal sectional view illustrating the motor housing assembly 100. FIGS. 1 through 3 are also be referenced in the following description.

As described above, the first space 510 may be between the aluminum housing 300 and the motor assembly 10. Also, the second space 520 may be between the plastic housing 200 and the aluminum housing 300.

A partition 310 may be disposed between the plastic housing 200 and the aluminum housing 300, for example, in the second space 520 to form the water flow channel.

Simultaneously, the partition 310 may serve as a second joining surface 311 by which the plastic housing 200 and the aluminum housing 300 are coupled through press-fitting. For example, although not shown, the partition 310 may be formed integrally with the plastic housing 200. Also, the partition 310 may be formed integrally with the aluminum housing 300 so as to be in contact with a counterpart portion when the press-fitting is performed (refer to FIG. 4, etc.). In a case in which the partition 310 is formed integrally with the aluminum housing 300 to protrude from the outer circumferential surface 301 of the aluminum housing 300 in the radially outward direction, the partition 310 may be in contact with the inner circumferential surface 201 of the plastic housing 200, thereby improving a fastening force between both components. The partition 310 may be manufactured integrally with the aluminum housing 300 using various methods such as cutting, computerized numerical control (CNC), die-casting, and the like. Among the methods, the die-casting may be suitable because die-casting manufacturing is relatively inexpensive once manufactured shape conditions are satisfied.

Desirably, the aluminum housing 300 except the partition 310 may be about 4 millimeters (mm) and a distance from the first space 510 to an outer circumferential surface of the plastic housing 200 may be about 17.5 mm.

To increase a path length of the water flow channel, the partition 310 may extend by a predetermined length in an axial direction of a motor and be provided as a plurality of partitions circumferentially disposed to be alternately adjacent to one end and the other end of the aluminum housing 300 based on the axial direction. A first partition of a pair of adjacent partitions selected from the plurality of partitions extends axially from one axial end of the aluminum housing, and a second partition of the pair of adjacent partitions extends axially from an opposite axial end of the aluminum housing. Since the partitions are alternately adjacent to the one end and the other end, the water flow channel may have a zigzag pattern in which cooling water flows from the one end to the other end and returns from the other end to the one end. In such a zigzag pattern, the cooling water may reduce a temperature while staying in the second space 520 over a large area for a relatively long time.

The plurality of partitions 310 may include a shield wall 312 that extends from one end to the other end in the axial direction to block a flow of a cooling fluid. Due to the shield wall 312, one of the two water flow channels 520 adjacent to both sides of the shield wall 312 may form an inlet channel 521 and the other of the two channels 520 may form an outlet channel 522. The cooling water introduced into the inlet channel 521 may circulate in a circumference direction away from the shield wall 312 to be discharged through the outlet channel 522.

The partition 310 of the one end and the partition 310 of the other end may differ in length and shape. For example, the partition 310 of the one end may be greater in length than the partition 310 of the other end. This may be to secure a space for cutting as described later.

When the inner circumferential surface 201 of the plastic housing 200 has a generally uniform diameter, the partition 310 that serves as the second joining surface 311 for the press-fitting may have a same diameter as a diameter of one area of the other end of the aluminum housing 300.

Although not shown, the aluminum housing 300 and the plastic housing 200 may be in tapered shapes in which diameters of the outer circumferential surface 301 and the inner circumferential surface 201 increase toward the other ends. In this case, when the press-fitting is initiated, the plastic housing 200 and the aluminum housing 300 may not interfere with each other due to a difference in diameter between the other end of the plastic housing 200 and one end of the aluminum housing 300 and thus, may be easily coupled.

A rib 304 may be formed to extend from the other axial end of the aluminum housing 300 in the radially outward direction. The aluminum housing 300 may be connected to a rear bracket 400 at one end based on the axial direction.

The other end of the plastic housing 200 may be in contact with the rib 304 of the aluminum housing 300, and one end of the plastic housing 200 may be in contact with an extended portion of the rear bracket 400 so as to form the sealed water flow channel.

Specifically, the plastic housing 200 may be formed to be in contact with the rib 304 and the rear bracket 400 in the axial direction, respectively. The rib 304 and the rear bracket 400 may prevent the plastic housing 200 from escaping to the other side or one side.

Based on an assembling order, the plastic housing 200 may be press-fitted to the aluminum housing 300 until the plastic housing 200 contacts the rib 304. Thereafter, the rear bracket 400 may be press-fitted to the aluminum housing 300. The rear bracket 400 may form an insertion groove 414 into which the aluminum housing 300 is inserted.

Alternately, a screw hole may be formed to connect the rear bracket 400 and the aluminum housing 300 simultaneously with or separately from the insertion of the aluminum housing 300 into the insertion groove 414. An outer screw hole 415 may be formed in the rear bracket 400. An inner screw hole 313 may be formed in an area corresponding to the outer screw hole 415 in the aluminum housing 300. The inner screw hole 313 may be formed in the partition 310. In this case, the partition 310 may be provided in a thickness greater than that of another portion so as to secure a space for the inner screw hole 313.

A first O-ring 611 may be provided circumferentially in a joining area between the plastic housing 200 and the rear bracket 400. A third O-ring 613 may be provided circumferentially in a joining area between the aluminum housing 300 and the plastic housing 200. Through this, a sealing reliability of the second space 520 may be improved.

Also, a second O-ring 612 may be provided circumferentially in a joining area between the aluminum housing 300 and the rear bracket 400 so as to improve the sealing reliability of the first space 510.

Recessed grooves may be formed in the joining areas to receive the O-rings. A recessed groove corresponding to the first O-ring 611 is defined as a first recessed groove 411. A recessed groove corresponding to the second O-ring 612 is defined as a second recessed groove 412. A recessed groove corresponding to the third O-ring 613 is defined as a third recessed groove 305. The first recessed groove 411 and the second recessed groove 412 may be desirably formed in the rear bracket 400 of both facing components due to ease of processing and a spatial sufficiency. Also, the third recessed groove 305 may be desirably formed in the aluminum housing 300 among both facing components due to the spatial sufficiency. The first recessed groove 411 extending in an axial direction from a first surface of the rear bracket 400 where the plastic housing 200 and the rear bracket 400 contact each other. The second recessed groove 412 extending in a radial direction from a second surface of the rear bracket 400 where the rear bracket 400 and the aluminum housing 300 contact each other. The third recessed groove 305 extending in the radial direction from a surface of the aluminum housing 300 where the aluminum housing 300 and the plastic housing 200 contact each other.

A water-cooling gate 413 and an oil-cooling gate 306 may be on one side or the other side of the motor housing assembly 100.

The water-cooling gate 413 may be provided as a through-hole formed in the rear bracket 400 to connect the second space 520 with an external area. The oil-cooling gate 306 may be provided as a through-hole formed on one side surface of the aluminum housing 300 in an axial direction, and connect the first space 510 with an external area to receive or discharge a cooling fluid.

Figure 6:
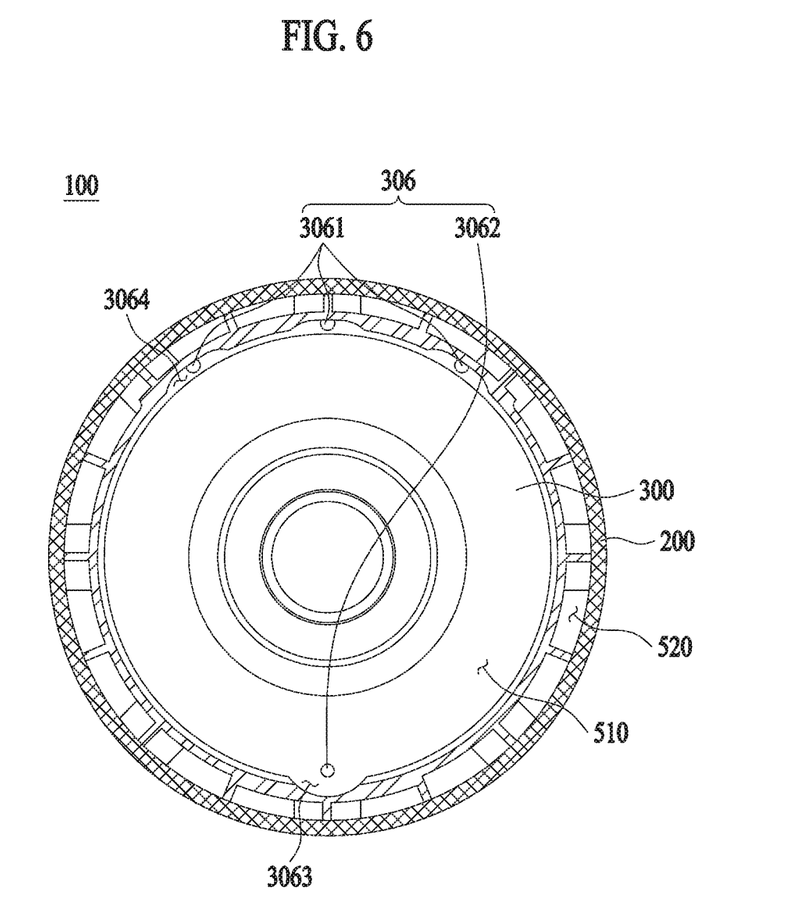
FIG. 6 illustrates a transverse section of a motor housing assembly according to the present disclosure.
Figure 7:
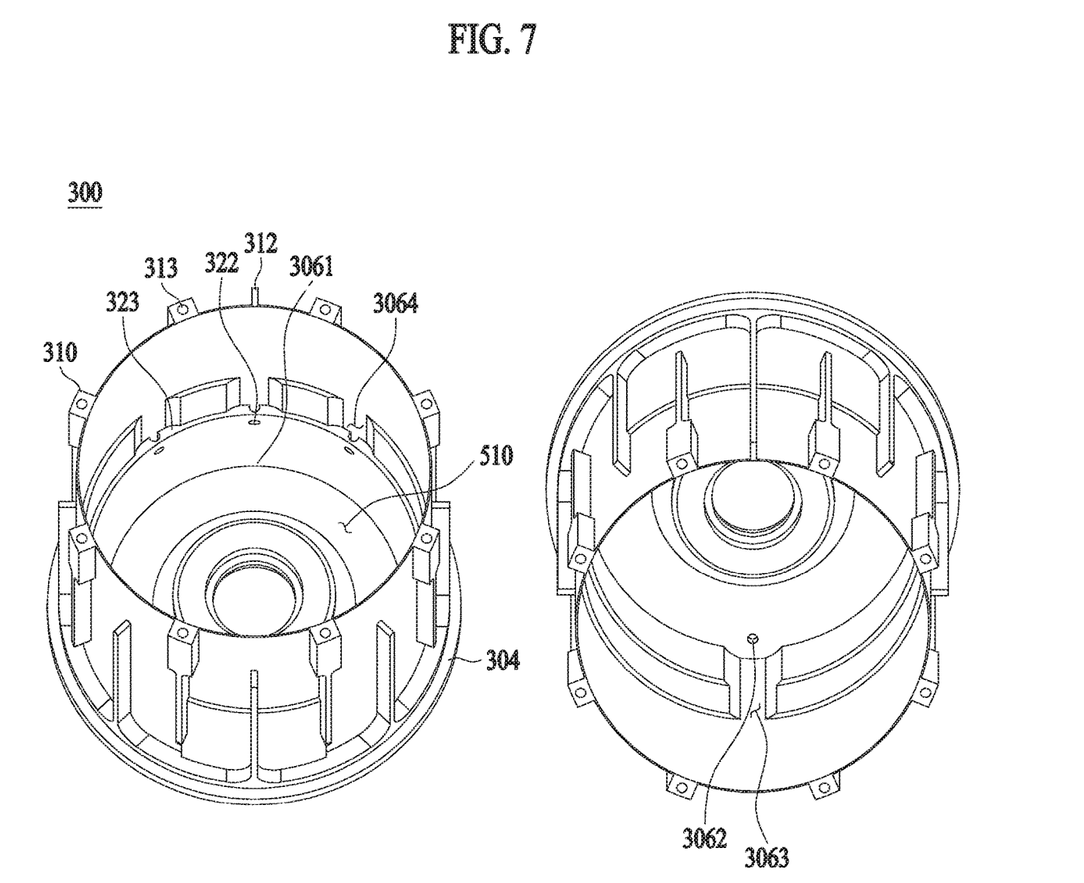
FIG. 7 illustrates an inner upper portion and an inner lower power of an aluminum housing.

FIG. 6 illustrates a transverse section of the motor housing assembly 100 and FIG. 7 illustrates an inner upper end portion and an inner lower end portion of the aluminum housing 300. FIGS. 4 and 5 are also referenced in the following description.

The shield wall 312 may be centrally positioned at the top. Channels adjacent to both sides of the shield wall 312 may include a water-cooling inlet 4131 and a water-cooling outlet 4132. The shield wall 312 and the partition 310 forming the channels may allow the cooling water to uniformly circulate in the second space 520 in the circumference direction.

On the other hand, it is difficult to form a separate circulating path in the first space 510. Thus, by locating an oil-cooling inlet 3061 formed in plural at an upper portion and locating an oil-cooling outlet 3062 at a lower portion, the cooling fluid may be naturally introduced, flow through a maximally large area, and then be discharged through the oil-cooling outlet 3062.

Also, an extended channel 321 may be formed such that the cooling fluid introduced from the other axial side into the oil-cooling inlet 3061 moves by a predetermined distance toward one axial side and flows into the first space 510 including the motor assembly 10, instead of being dropped directly. The extending channel 321 may have a shape in which the cooling fluid is discharged downward at a plurality of points to flow into a large area of the motor assembly 10. For example, the extended channel 321 may form a drop hole 322 at a predetermined point and include a guide plate 323 that guides the cooling fluid to an outermost circumferential surface of the motor assembly 10. A portion of the introduced cooling fluid may be discharged through the drop hole 322, and a remaining portion may flow along the guide plate 323 to a rear side of the motor assembly 10 to be dropped. Desirably, the drop hole 322 may be formed in about 6 mm.

To smoothly introduce and discharge the cooling fluid, an inlet step 3064 and an outlet step 3063 may be formed in a vicinity of the oil-cooling inlet 3061 and the oil-cooling outlet 3062 to secure wider spaces as compared to peripheries. The outlet step 3063 and the inlet step 3064 may secure spaces for a large amount of cooling fluid to flow, thereby preventing a bottleneck phenomenon.

Figure 8:
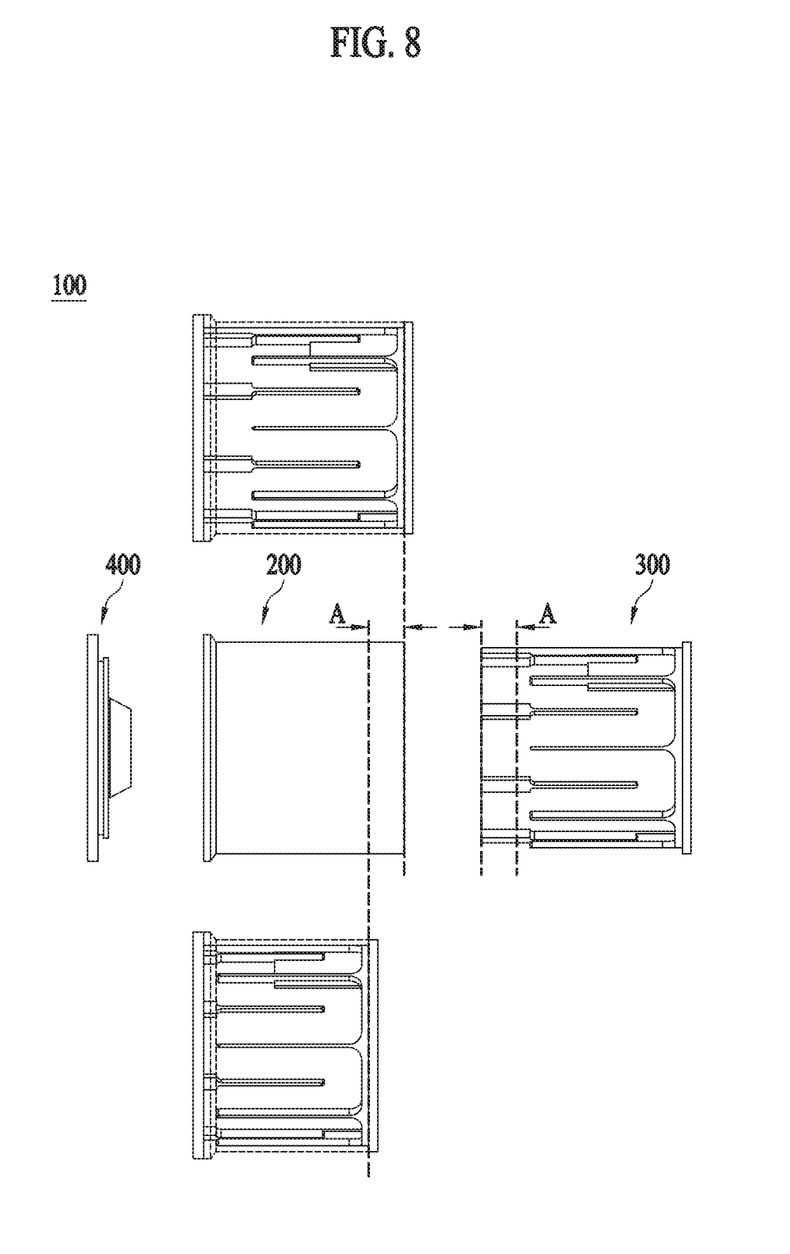
FIG. 8 illustrates states of a motor housing assembly assembled before cutting, disassembled before cutting, and assembled after cutting according to the present disclosure.

FIG. 8 illustrates states of the motor housing assembly 100 assembled before cutting, disassembled before cutting, and assembled after cutting according to the present disclosure.

According to technical characteristics of the present disclosure, the motor housing assembly 100 may be adjustable in axial length based on a specification of the motor assembly 10. For example, when the motor housing assembly 100 needs to be reduced by a length of A, the plastic housing 200 may be cut by A at the other end and the aluminum housing 300 may be cut by A at one end. Thereafter, the plastic housing 200 is coupled with the aluminum housing 300, so that the motor housing assembly 100 reduced by the length A is obtained.

Figure 9:
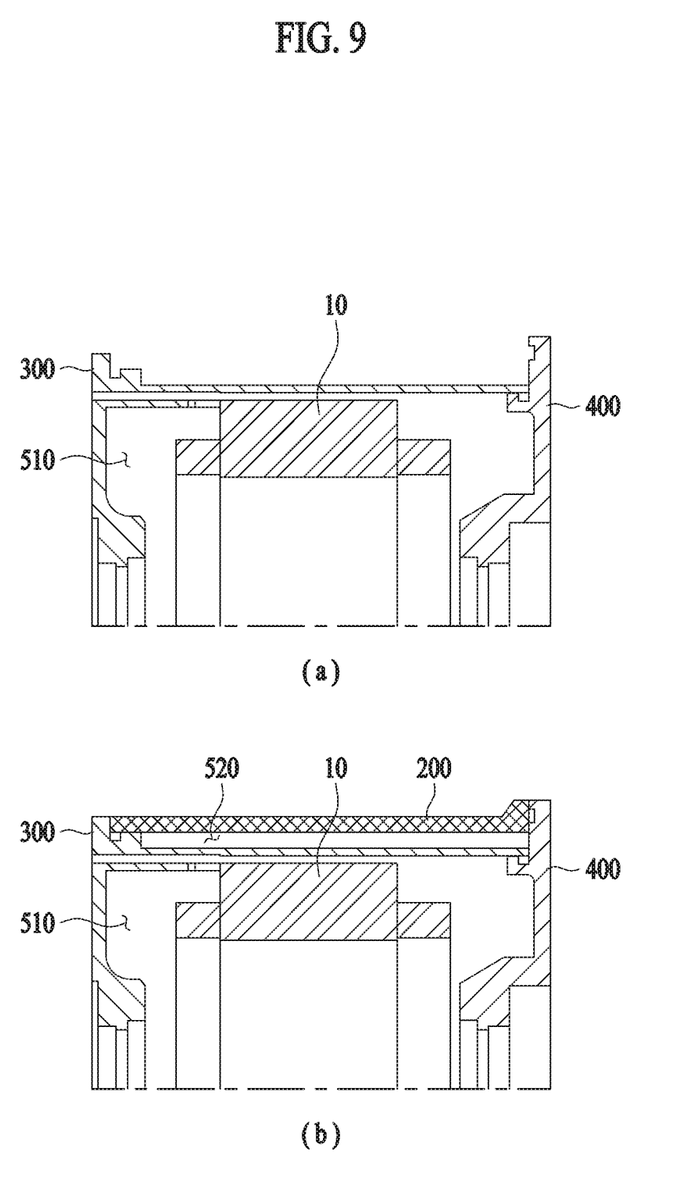
FIG. 9 is a longitudinal sectional view illustrating a motor housing assembly coupled with and decoupled from a plastic housing the present disclosure.

FIG. 9 is a longitudinal sectional view illustrating the motor housing assembly 100 coupled with and decoupled from the plastic housing 200.

In general, cooling may be performed in a state in which the plastic housing 200 is fully coupled with the aluminum housing 300. However, in some cases, since the first space 510 is effectively formed even if the plastic housing 200 is omitted, the cooling may be performed using the oil flow channel. Also, the cooling may be performed using only the second space 520 which is the water flow channel in the state in which the plastic housing 200 is fully coupled. The motor housing assembly 100 may selectively perform at least one of water-cooling and oil-cooling. When the oil-cooling is performed only, the plastic housing 200 may be omitted.

According to at least one example embodiment, it is possible to achieve a reduced rate of a motor cooling structure.

Further, according to at least one example embodiment, it is possible to simplify a manufacturing process of a motor cooling structure.

Further, according to at least one example embodiment, it is possible to reduce a manufacturing cost of a motor cooling structure.

Further, according to at least one example embodiment, it is possible to flexibly perform a housing length adjustment in response to a change in axial size of a motor.

Additional ranges of possibilities will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

It will be apparent to those skilled in the art that the present disclosure may be materialized in other specific forms without departing from the essential characteristics of the present disclosure.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A motor housing assembly comprising:
   an aluminum housing coupled to an outer circumferential surface of a motor assembly and configured to form a first space between the aluminum housing and the motor assembly, the first space including an oil flow channel;
   a plastic housing coupled to an outer circumferential surface of the aluminum housing and configured to form a second space between the plastic housing and the aluminum housing, the second space including a water flow channel;
   a rear bracket coupled to the aluminum housing at one axial end of the aluminum housing; and
   a rib configured to radially extend from an opposite end of the aluminum housing,
   wherein the plastic housing is in contact with the rear bracket and the rib in an axial direction, and
   wherein the motor housing assembly further comprises:
      a first O-ring provided between the plastic housing and the rear bracket;
      a second O-ring provided between the rear bracket and the aluminum housing;
      a third O-ring provided between the aluminum housing and the plastic housing;
      a first recessed groove extending in an axial direction from a first surface of the rear bracket where the plastic housing and the rear bracket contact each other, the first recessed groove being configured to receive the first O-ring;
      a second recessed groove extending in a radial direction from a second surface of the rear bracket where the rear bracket and the aluminum housing contact each other, the second recessed groove being configured to receive the second O-ring; and
      a third recessed groove extending in the radial direction from a surface of the aluminum housing where the aluminum housing and the plastic housing contact each other, the third recessed groove being configured to receive the third O-ring.

2. The motor housing assembly of claim 1, wherein the plastic housing is configured to be coupled to the aluminum housing through press-fitting.

3. The motor housing assembly of claim 2, wherein the aluminum housing further comprises an insertion chamfer at the one axial end of the aluminum housing, the insertion chamfer including a surface inclined in a radially inward direction.

4. The motor housing assembly of claim 2, wherein the aluminum housing further comprises a first joining surface configured to be in contact with an inner circumferential surface of the plastic housing at the one axial end of the outer circumferential surface of the aluminum housing.

5. The motor housing assembly of claim 1, wherein the aluminum housing further comprises:
   a partition that protrudes from the outer circumferential surface in a radially outward direction, the partition being configured to form the water flow channel,
   wherein the partition includes a second joining surface configured to be in contact with an inner circumferential surface of the plastic housing.

6. The motor housing assembly of claim 5, wherein the partition includes a plurality of partitions, each of the partitions being configured to extend to a predetermined length in an axial direction of the motor assembly, wherein
   a first partition of a pair of adjacent partitions selected from the plurality of partitions extends axially from the one axial end of the aluminum housing, and
   a second partition of the pair of adjacent partitions extends axially from an opposite axial end of the aluminum housing.

7. The motor housing assembly of claim 6, wherein the plurality of partitions includes a shield wall that extends from the one end to the opposite end in the axial direction to block a flow of a cooling fluid, and
   one of two channels adjacent to both sides of the shield wall forms an inlet channel and the other of the two channels forms an outlet channel.

8. The motor housing assembly of claim 1, wherein an inner circumferential surface of the plastic housing has a generally uniform diameter.

9. The motor housing assembly of claim 1, further comprising:
   a water-cooling gate in the rear bracket, the water-cooling gate including a through-hole extending toward the second space.

10. The motor housing assembly of claim 1, wherein the rear bracket further comprises an insertion groove into which the aluminum housing is inserted.

11. The motor housing assembly of claim 1, wherein the aluminum housing is die-cast and the plastic housing is injection-molded.

12. The motor housing assembly of claim 1, wherein the aluminum housing further includes an oil-cooling gate formed in one side surface and configured to connect the first space with an external area and to receive or discharge a cooling fluid.

13. The motor housing assembly of claim 12, wherein the oil-cooling gate includes an oil-cooling inlet and an oil-cooling outlet, the oil-cooling inlet is formed in an upper portion of the one side surface of the aluminum housing, and the oil-cooling outlet is formed in a lower portion of the one side surface of the aluminum housing.

14. The motor housing assembly of claim 13, wherein the aluminum housing further comprises an extended channel configured to move the cooling fluid introduced through the oil-cooling inlet, toward one axial end of the motor assembly by a predetermined distance from an axial end of the motor assembly toward an opposite axial end of the motor assembly.

15. The motor housing assembly of claim 14, wherein the extended channel comprises:

a drop hole through which a portion of the cooling fluid is configured to enter the first space after traveling by the predetermined distance toward the one axial end; and a guide plate configured to direct a remaining portion of the cooling to enter the first space after traveling farther than the predetermined distance toward the one axial end.

16. The motor housing assembly of claim 1, wherein a distance between the rib and the rear bracket corresponds to a length of the plastic housing.

17. A motor housing assembly comprising:

a metal housing coupled to an outer circumferential surface of a motor assembly and configured to form a first space between the metal housing and the motor assembly, the first space including an oil flow channel;

a plastic housing coupled to an outer circumferential surface of the metal housing and configured to form a second space between the plastic housing and the metal housing, the second space including a water flow channel;

a rear bracket coupled to the metal housing at one axial end of the metal housing, the rear bracket including a water-cooling gate formed through the rear bracket and communicating with the water flow channel; and a rib configured to radially extend from an opposite end of the metal housing, wherein the plastic housing in in contact with the rear bracket and the rib in an axial direction of the metal housing, and wherein the water flow channel extends in the axial direction of the metal housing and has one end defined by the rear bracket and the other end defined by the rib.

\* \* \* \* \*